United States Patent
Okawa et al.

(10) Patent No.: US 6,911,238 B2
(45) Date of Patent: Jun. 28, 2005

(54) LIQUID CRYSTAL COMPOSITIONS, POLARIZATION SELECTIVE MEMBRANES AND LIQUID CRYSTAL DISPLAYS

(75) Inventors: Atsuhiro Okawa, Minami-ashigara (JP); Michio Nagai, Minami-ashigara (JP); Masaki Noro, Minami-ashigara (JP)

(73) Assignee: Fuji Photo Film Co., Ltd., Minami-Ashigara (JP)

(*) Notice: Subject to any disclaimer, the term of this patent is extended or adjusted under 35 U.S.C. 154(b) by 74 days.

(21) Appl. No.: 10/374,074

(22) Filed: Feb. 27, 2003

(65) Prior Publication Data

US 2003/0218715 A1 Nov. 27, 2003

(30) Foreign Application Priority Data

Feb. 27, 2002 (JP) ........................................ 2002-050836
Mar. 25, 2002 (JP) ........................................ 2002-082395

(51) Int. Cl.[7] ............................. C09K 19/52; G02F 1/13
(52) U.S. Cl. ........................ 428/1.1; 428/1.3; 428/1.31; 252/299.01; 349/96; 349/171; 349/172; 349/194
(58) Field of Search ................................ 428/1.3, 1.31, 428/1.1; 252/299.01; 349/96, 171, 172, 194

(56) References Cited

U.S. PATENT DOCUMENTS 5,187,248 A * 2/1993 Etzbach et al. ............. 526/243
6,217,792 B1 * 4/2001 Parri et al. .............. 252/299.61

FOREIGN PATENT DOCUMENTS

| JP | 7-118202 A | 5/1995 |
| JP | 8-120271 A | 5/1996 |
| JP | 8-291148 A | 11/1996 |
| JP | 9-506088 A | 6/1997 |
| JP | 2000-310780 A | 11/2000 |
| JP | 2000-515496 A | 11/2000 |

OTHER PUBLICATIONS

V. Vill et al, "Ferroelektrische Flüssigkristall–Mischungen mit Kohlenhydrat–Derivaten als Dotlerstoffe"; *Z. Naturforsch.*, 44a, pp. 675–679 (1989).

* cited by examiner

*Primary Examiner*—Shean C Wu
(74) *Attorney, Agent, or Firm*—Burns, Doane, Swecker & Mathis, L.L.P.

(57) ABSTRACT

A novel polarization selective membrane is disclosed. The membrane comprises a liquid crystal molecule having a helical structure and selectively transmits specific polarized light and selectively reflects the other polarized light. The helical axis of the helical structure is practically oriented in the normal direction of the membrane plane, and the angle between the helical axis of the helical structure and the long axis of the liquid crystal molecules is from 5° to 85°. The membrane may be prepared by using a composition comprising a compound represented by Formula (I): wherein X represents a group having an optically active site, M represents a group having at least one aromatic carbocycle or aromatic heterocycle, $Y^1$ and $Y^2$ independently represent a bivalent group; $R^1$ to $R^3$ independently represent a hydrogen atom or an alkyl group, R represents an alkyl group Formula (I)

$$\{R-(Y^2)_{m2}-M-(Y^1)_{m1}\}_n-X.$$

23 Claims, 2 Drawing Sheets

LIQUID CRYSTAL COMPOSITIONS, POLARIZATION SELECTIVE MEMBRANES AND LIQUID CRYSTAL DISPLAYS

FIELD OF THE INVENTION

The present invention relates to liquid crystal compositions forming a helical structure and suitable for use in various optical films, as well as polarization selective membranes and polarization selective films selectively transmitting specific polarized light and selectively reflecting the other polarized light using liquid crystal compositions.

DESCRIPTION OF RELATED ART

Natural light such as sunlight or the light from normal artificial light sources such as lamps is unpolarized light (randomly polarized light), but polarized components (linearly polarized light, circularly polarized light, elliptically polarized light) can be collected therefrom by the use of a polarizing plate. Collected polarized light can be used in various optical equipments. Currently widely distributed liquid crystal display devices can be described as devices using the nature of polarized light to display images.

FIG. 4 shows a schematic diagram of a typical liquid crystal display device.

The typical liquid crystal display device shown in FIG. 4 comprises a sheet-like light emitter as a light source consisting of an edge lighting backlight source 11 at the bottommost face, a reflector 12 for allowing the backlight to successively emerge upward from the bottom and a light guide 13. A liquid crystal cell 16 sandwiched between two conventional light-absorbing polarizing plates 14 and 15 on both sides is provided above the light source, whereby the device has an image-displaying function.

Light-absorbing polarizing plates 14 and 15 shown in FIG. 4 are typically made from a polyvinyl alcohol film. Polyvinyl alcohol-based polarizing plates can be prepared by orienting a polyvinyl alcohol film and adsorbing iodine or a dichroic dye to it. The transmission axis (polarization axis) of the polarizing plates corresponds to the direction perpendicular to the orienting direction of the film. Light-absorbing polarizing plates transmit only polarized components parallel to the polarization axis and absorb polarized components in the direction orthogonal thereto. Thus, the light utilization efficiency is theoretically 50% or less (practically, further less), and the liquid crystal display device shown in FIG. 4 also fails to theoretically attain a light utilization efficiency of 50% or more with this arrangement because at least 50% of the light emitted from the light source is absorbed by the lower light-absorbing polarizing plate 14.

As described above, the use of light-absorbing polarizing plates in conventional liquid crystal display devices contributes to the decrease of the light utilization efficiency, and therefore the decrease of the brightness of the image displayed. Thus, it would be highly desirable to develop a technique for efficiently converting natural light or unpolarized light into desired linearly polarized light to increase the light utilization efficiency in various optical devices such as liquid crystal devices.

In order to improve the light utilization efficiency in polarizing plates, it has been proposed to use light-reflective polarizing plates in place of or in addition to light-absorbing polarizing plates. Light-reflective polarizing plates can be classified into two main types. One uses a stack of a plurality of layers having different refractive indices as proposed in JP-A 1997-506985 and JP-A 1997-507308 (the term "JP-A" as used herein means an "unexamined published Japanese patent application"). However, this method had problems such as difficulty in preparing a film stack or sophistication or processing by laminating to other functional films. The second method uses selective reflection of cholesteric liquid crystals as disclosed in JP-A 1996-271892 and JP-A 1996-271837. This method solved many of the problems above, but had the disadvantage that it is highly dependent on the angle of the light incident on the light-reflective polarizing plates and it was difficult to obtain homogeneous reflection characteristics over the entire visible light. It also had the disadvantage that the temperature must be precisely controlled during manufacturing because the helical pitch of many of cholesteric liquid crystals widely varies with temperature to result in the variation of the wavelength range of selective reflection.

JP-A 2000-310780 discloses a liquid crystal film, of which the direction of the helical axis of the smectic liquid crystal phase with a helical structure is fixed so as to be nearly vertical to the substrate surface, and an optical element containing the film.

It is well known that a cholesteric phase having a helical structure is induced by adding an optically active compound to a liquid crystal composition showing a nematic phase. Optically active compounds that induce a helical structure when they are added to a liquid crystal composition consisting of a naturally optically inactive compound are called chiral agents. The pitch length of the helical structure decreases as the concentration of the chiral agent increases, and the pitch length of a composition containing a different type of chiral agent at the same concentration varies with the structure of the chiral agent. When a chiral agent is added at the same concentration, the helical twisting power (htp) of the chiral agent tends to be stronger as the pitch length of the induced helical structure becomes shorter. The helical twisting power ($\beta$) is generally expressed as $\beta=1/(c\times P)$ where c represents the fraction of the chiral agent and P represents the pitch length. Thus, chiral agents should preferably have a high helical twisting power in order to control physical properties of liquid crystal compositions because such compounds can induce a helical structure having a short pitch length with small amounts.

It is also known that liquid crystal compositions having a helical structure are formed by using an optically active compound or mixing an optically inactive compound with an optically active compound in a phase of a liquid crystal compound longitudinally tilted from the normal line of the smectic phase, such as smectic C phase. For example, JP-A 1995-118202, JP-A 1996-120271 and JP-A 1996-291148 disclose that a chiral smectic C phase having a helical structure can be induced by adding a chiral agent to a liquid crystal composition showing a smectic C phase. However, any composition capable of reflecting visible light to suit the object of the present invention is not disclosed. JP-A 1997-506088, JP-A 1998-158268, JP-A 1999-193287 and JP-A 2000-515496 and Z. Naturforsch, Vol. 44a, pp. 675–679 (1989) disclose carbohydrate derivatives as chiral agents for inducing a cholesteric phase, but refer to nothing about other phases than cholesteric phases. Z. Naturforsch, Vol. 43a, pp. 1119–1125 (1988) describes a chiral smectic C phase containing a carbohydrate derivative, but refers to nothing about the use of its selective reflection. On the other hand, chiral agents having a low helical twisting power must be added in large quantities so that the freedom of controlling physical properties of liquid crystal compositions is disadvantageously limited. Even compounds having a high helical twisting power in the cholesteric phase were sometimes incompatible with smectic liquid crystals or destabilized the smectic phase when they were added to smectic liquid crystals. Thus, there are demands for chiral agents having a high helical twisting power in liquid crystal phases other than the cholesteric phase and liquid crystal compositions containing small amounts of such chiral agents to have a helical structure whose pitch length is sufficiently short to selectively reflect visible light.

SUMMARY OF THE INVENTION

An object of the present invention is to provide a liquid crystal composition capable of stably forming a helical structure and showing desired optical characteristics. Another object of the present invention is to provide a novel polarization selective membrane and polarization selective film contributing to the improvement of the light utilization efficiency of polarizing plates, and particularly to provide a novel polarization selective membrane and polarization selective film showing homogeneous and high reflection characteristics over a large area in which the reflection characteristics of the polarization selective membrane are easy to control and the film is readily sophisticated by laminating to other functional films to show excellent manufacturing suitability.

In one aspect, the present invention provides a polarization selective membrane comprising a liquid crystal molecule having a helical structure, selectively transmitting specific polarized light and selectively reflecting the other polarized light, wherein the helical axis of the helical structure is practically oriented in the normal direction of the membrane plane and the angle formed by the orientation of the helical axis of the helical structure and the orientation of the long axis of the liquid crystal molecules is from 5° to 85°.

As embodiments of the present invention, there are provided the polarization selective membrane according to claim 1, having a maximum total transmittance of 75% or more and a minimum total transmittance of less than 60% at a polarizing plane perpendicular to the membrane plane; and the polarization selective membrane wherein liquid crystal molecules have a chiral smectic phase.

In another aspect, the present invention provides a polarization selective film comprising:

a transparent support and a layer comprising liquid crystal molecules having a helical structure and selectively transmitting specific polarized light and selectively reflecting the other polarized light, wherein the helical axis of the helical structure is practically oriented in the normal direction of the membrane plane and the angle formed by the orientation of the helical axis of the helical structure and the orientation of the long axis of the liquid crystal molecules is 5° to 85°.

In another aspect, the present invention provides a method for polarizing light comprising entering light into the polarization selective film to transmit specific circularly polarized light in an incident light and to reflect the other circularly polarized light, reflecting the reflected light by a reflector also serving as a polarization converting layer to enter it again into the polarization selective film, and converting the circularly polarized light emerging from the polarization selective film into linearly polarized light via a retardation layer.

In another aspect, the present invention provides an apparatus for polarizing light comprising a sheet-like light emitter, a polarization selective film and a retarder arranged in this order wherein the sheet-like light emitter comprises a light guide having a light source on the side face and a reflective layer at the bottom, the polarization selective film is the polarization selective film and the retarder has a phase change of 100 to 200 nm.

In another aspect, the present invention provides a polarizing plate comprising the polarization selective film, a retarder having a phase change of 100–200 nm and a light-absorbing polarizing plate laminated in this order wherein the direction having a polarization plane on which the total transmittance of the polarization selective film is maximum and the direction of the transmission axis of the light-absorbing polarizing plate is substantially parallel.

In another aspect, the present invention provides a liquid crystal display device comprising a backlight, a polarization selective film, a retarder and a liquid crystal cell sandwiched between a pair of light-absorbing polarizing plates arranged in this order wherein the backlight comprises a light guide having a light source on the side face and a reflective layer at the bottom, the polarization selective film is the polarization selective film and the retarder has a phase change of 100 to 200 nm.

As embodiments of the present invention, there are provided the device wherein the polarization selective film, the retarder and the light-absorbing polarizing plate near to the backlight are integrated; the device comprising a light scattering sheet and a light-collecting film between the backlight and the polarization selective film; the device wherein the polarization selective film comprises an antireflection layer on the surface near to the backlight; and the device wherein the a polarizing plate direction, in which the polarization selective film has a maximum total transmittance, is substantially parallel to the transmission axis of the light-absorbing polarizing plate near to the backlight.

In another aspect, the present invention provides a liquid crystal composition comprising at least one liquid crystal and an optically active compound, capable of forming a helical structure in which the angle formed by the orientation of the helical axis and the orientation of the long axis of the liquid crystal molecules is from 5° to 85° and the optically active compound is a compound of formula (I) below:

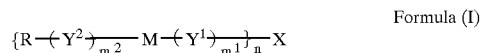

Formula (I)

wherein X represents a group having an optically active site, M represents a group having at least one aromatic carbocycle or aromatic heterocycle, $Y^1$ and $Y^2$ independently represent —O—, —S—, —C(=O)O—, —OC(=O)—, —OC(=O)O—, —C(=O)N($R^1$)—, —N($R^1$)C(=O)—, —($CR^2R^3$)$_m$O—, —$SO_2$N($R^1$)—, —N($R^1$)$SO_2$— or —S(=O)$_p$—; $R^1$, $R^2$ and $R^3$ independently represent a hydrogen atom or an optionally substituted alkyl group; m represents an integer of any of 1 to 12, p represents an integer of any of 0 to 2, $m^1$ and $m^2$ independently represents 0 or 1, provided that when $m^1$ and $m^2$ are each 0, M and X and M and R are directly bonded; R represents an optionally substituted alkyl group and n represents an integer of any of 2 to 6.

As embodiments of the present invention, there are provided the composition further comprising a liquid crystal compound; the composition wherein X in Formula (I) is a cyclic group having an optically active site; the composition wherein X in Formula (I) is a cyclic group selected from Group I:

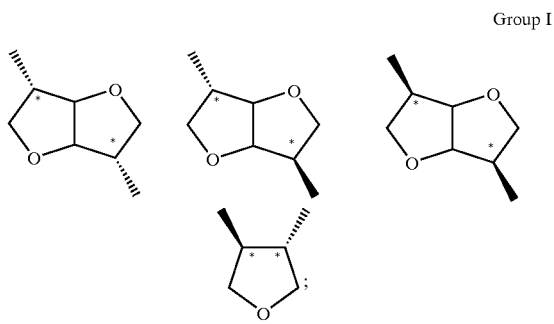

the composition wherein M in Formula (I) is a group represented by Formula (II) bellow:

Formula (II):

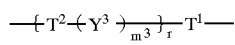

Wherein $T^1$ and $T^2$ independently represent an aromatic carbocycle, aromatic heterocycle or aliphatic carbocycle, and at least one represents an aromatic carbocycle or an aromatic heterocycle; $Y^3$ independently represents —O—, —C(=O) O—, —OC(=O)—, —CH$_2$O—, —OCH$_2$—, —CH=N— or —N=CH—; $m^3$ represents 0 or 1, provided that when $m^3$ is 0, $T^1$ and $T^2$ are directly bonded; and r represents an integer of any of 0 to 3; the composition wherein the helical structure is based on a chiral smectic phase.

In another aspect, the present invention provides a polarization selective membrane comprising the liquid crystal composition having a helical structure with the helical axis practically oriented in the normal direction of the membrane plane and selectively transmitting specific polarized light and selectively reflecting the other polarized light.

In another aspect, the present invention provides a polarization selective film comprising:

a transparent support and a layer comprising the liquid crystal composition having a helical structure with the helical axis practically oriented in the normal direction of the membrane plane and selectively transmitting specific polarized light and selectively reflecting the other polarized light.

DETAILED DESCRIPTION OF THE INVENTION

Figure 1:
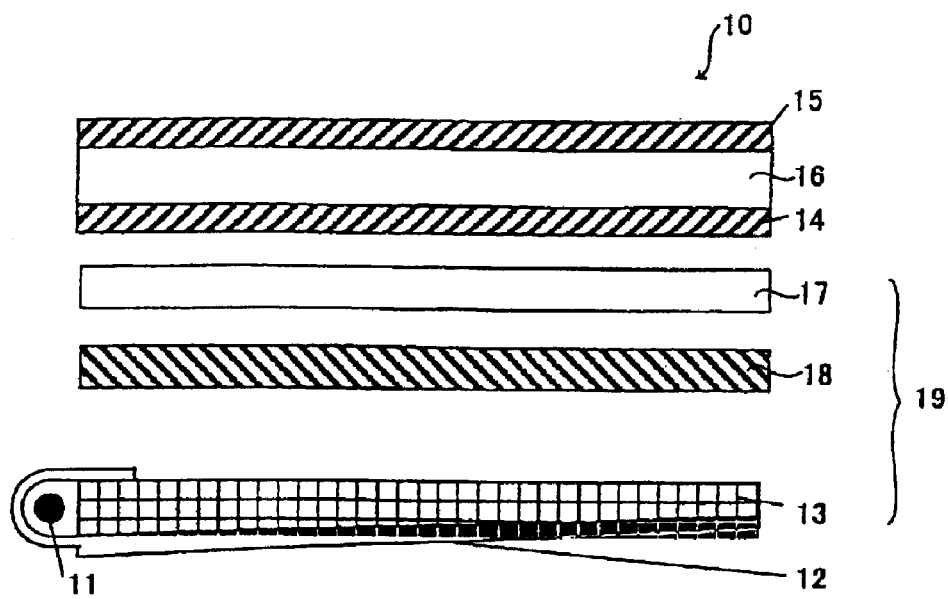
FIG. 1 is a schematic diagram showing an embodiment of a liquid crystal display device using a polarization selective film of the present invention.

[Polarization Selective Membranes and Polarization Selective Films]

The present invention provides a polarization selective membrane comprising liquid crystal molecules having a helical structure and selectively transmitting specific polarized light and selectively reflecting the other polarized light, characterized in that the helical axis of the helical structure is practically oriented in the normal direction of the membrane plane and the angle formed by the orientation of the helical axis of the helical structure and the orientation of the long axis of the liquid crystal molecules is 5° to 85°.

The present invention also provides a polarization selective film characterized in that the polarization selective membrane of the present invention is formed as a lamellar polarization selective layer on a transparent support.

In the present invention, liquid crystal molecules are oriented at an angle of 5° to 85° (preferably 15° to 80°, more preferably 20° to 80° ) between the orientation of the helical axis and the orientation of the long axis of the crystal liquid molecules to form a helical structure. The helical structure may be formed by a single liquid crystal molecule or a mixture of a plurality of liquid crystal molecules or a mixture of a liquid crystal and a non-liquid crystalline compound. The liquid crystal phase shown by these liquid crystal molecules or mixture is preferably a smectic phase, especially a chiral smectic phase, particularly chiral smectic C phase, chiral smectic F phase or chiral smectic I phase, among which chiral smectic C phase is especially preferred. However, liquid crystal molecules may not be optically active to form a helical structure, but liquid crystals forming a helical structure without having any optical active site may be used as shown in J. Mat. Chem., Vol. 7, p. 1307 (1997), for example.

The smectic liquid crystal phase having a helical structure has a structure consisting of a stack of smectic layers like normal smectic liquid crystal phases, but the orientation of the long axis of the liquid crystal molecules is tilted at an angle from the direction perpendicular to each smectic layer and the tilt direction is shifted little by little from one layer to the next layer to form a helical structure. A preferred embodiment of the polarization selective membrane of the present invention comprises a liquid crystal layer maintaining a smectic phase having a helical structure, i.e. liquid crystal molecules are oriented with the long axis being tilted at 5 to 85° with respect to the helical axis and the tilt direction is shifted little by little from one smectic layer to the next smectic layer to form a helical structure.

Liquid crystal molecules used in the present invention are preferably obtained by adding a chiral agent or introducing an optically active unit into a liquid crystalline compound as described above in order to show a smectic liquid crystal phase having a desired helical structure. For example, liquid crystal compounds capable of showing a chiral smectic phase more likely to form a helical structure such as chiral smectic C phase, chiral smectic I phase or chiral smectic F phase can be obtained by adding a chiral agent to a liquid crystal compound showing smectic C phase, smectic I phase, smectic F phase or the like or introducing an optically active unit into said liquid crystal compound. The helical pitch can be controlled by appropriately adjusting the amount of the chiral agent to be added, the amount of the optically active unit to be introduced, the optical purity, the temperature condition during orientation or other factors, and even characteristics of the film such as selective reflection wavelength in the case for use as a selective reflection element can be controlled.

Whether the helical structure is right-handed or left-handed depends on the chirality of the chiral agent or optically active unit used, and either right or left-handed helical structure can be prepared depending on the chirality selected.

Liquid crystals showing a (chiral) smectic phase and chiral agents are preferably compounds of formula (I) below. Optically active compounds of formula (I) below can form the helical structure described above alone or in combination with optically inactive liquid crystalline compounds and/or optically active liquid crystalline compounds. That is, compounds of formula (I) below contribute to the formation of the helical structure described above mainly as chiral agents and/or liquid crystalline compounds.

Especially, the polarization selective membrane is preferably prepared from a liquid crystal composition containing an optically inactive liquid crystalline compound and an optically active compound of formula (I) below. In this embodiment, the helical pitch can be easily controlled by appropriately adjusting the amount of the optically active compound to be added, the amount of the optically active unit to be introduced, the optical purity, the temperature condition during orientation or other factors. When the membrane is used to form an optical film or the like, therefore, characteristics of the film such as selective reflection wavelength in the case for use as a selective reflection element can be easily controlled.

Next, optically active compounds of formula (I) below are explained in detail.

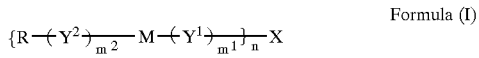

Formula (I)

wherein X represents a group having an optically active site, M represents a group having at least one aromatic carbocycle or aromatic heterocycle, $Y^1$ and $Y^2$ independently represent —O—, —S—, —C(=O)O—, —OC(=O)—, —OC(=O)O—, —C(=O)N($R^1$)—, —N($R^1$)C(=O)—, —($CR^2R^3$)$_m$O—, —SO$_2$N($R^1$)—, —N($R^1$)SO$_2$— or —S(=O)$_p$— where $R^1$, $R^2$ and $R^3$ independently represent a hydrogen atom or an optionally substituted alkyl group, m represents an integer of any of 1 to 12, and p represents an integer of any of 0 to 2. $m^1$ and $m^2$ independently represent 0 or 1, provided that when $m^1$ and $m^2$ are each 0, M and X and M and R are directly bonded.

In the formula, R represents an optionally substituted alkyl group. n represents an integer of any of 2 to 6, preferably an integer of any of 2 to 4, more preferably 2 or 3.

In formula (I), X represents a group having an optically active site. X may contain one or more optically active sites. Also taking into account availability, preferred examples are sugars, optically active di- or polyhydric alcohols, di- or polycarboxylic acids, hydroxycarboxylic acids, amino acids, binaphthyl derivatives and biphenyl derivatives, as well as the structures mentioned as preferred examples for X in JP-A 1997-506088. Other preferred examples include the following structures.

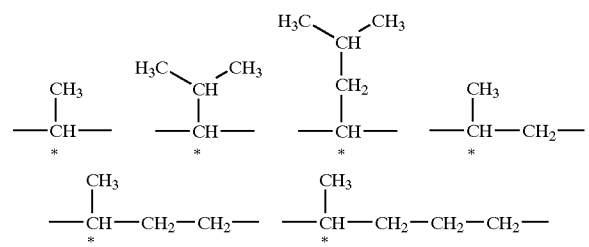

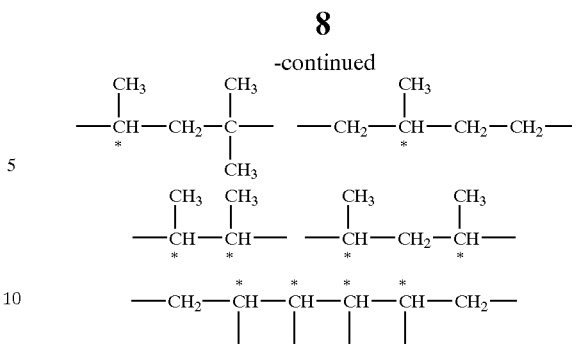

X may be further substituted by the groups exemplified above. The examples of the substituents include hydroxy, halogen atom (such as Cl, Br, F and I), cyano, nitro, carboxyl, sulfo, chain or cyclic alkyl groups having $C_{1-20}$ (such as methyl, ethyl, isopropyl, n-butyl, n-hexyl, cyclopropyl cyclohexyl, 2-hydroxyethyl, 4-carboxybutyl, 2-methoxyethyl, 2-diethylaminoethyl), alkenyl groups having $C_{1-20}$ (such as vinyl, allyl, 2-hexenyl), alkynyl groups having $C_{2-20}$ (such as ethynyl, 1-butynyl, 3-hexynyl), aralkyl groups having $C_{7-12}$ (such as benzyl, phenethyl), aryl groups having $C_{6-10}$ (such as phenyl, naphthyl, 4-carboxyphenyl, 4-acetoamidephenyl, 3-methanesulfoneamidephenyl, 4-methoxyphenyl, 3-carboxyphenyl, 3,5-dicarboxyphenyl, 4-methanesulphoneamidephenyl, 4-butanesulfoneamidephenyl), acyl groups having $C_{1-10}$ (such as acetyl, benzoyl, propanoyl, butanoyl), alkoxycarbonyl groups having $C_{2-10}$ (such as methoxycarbonyl, ethoxycarbonyl), aryloxycarbonyl groups having $C_{7-12}$ (such as phenoxycarbonyl, naphtoxycarbonyl), carbamoyl groups having $C_{1-10}$ (such as non-substituted carbamoyl, methylcarbamoyl, diethylcarbamoyl, phenylcarbamoyl), alkoxy groups having $C_{1-20}$ (such as methoxy, ethoxy, butoxy, methoxy ethoxy), aryloxy carbonyl groups having $C_{6-12}$ (such as phenoxy, 4-carboxyphenoxy, 3-methylphenoxy, naphtoxy), acyloxy groups having $C_{2-12}$ (such as acetoxy, benzoyloxy), sulfonyloxy groups having $C_{1-12}$ (such as methyl sulfonyloxy, phenyl sulfonyloxy), amino groups having $C_{0-10}$ (such as non-substituted amino, dimethylamino, diethylamino, 2-carboxyethylamino), acylamino groups having $C_{1-10}$ (such as non-substituted acetamide, benzamide), sulfonylamino groups having $C_{1-20}$ (such as methylsulfonylamino, phenylsulfonylamino, butylsulfonylamino, n-octylsulfonylamino), ureido groups having $C_{1-10}$ (such as non-substituted ureido, methylureido), urethane groups having $C_{2-10}$ (such as methoxycarbonylamino, ethoxycarbonylamino), alkylthio groups having $C_{1-12}$ (such as methylthio, ethylthio, octylthio), arylthio groups having $C_{6-12}$ (such as phenylthio, naphthylthio), alkylsulfonyl groups having $C_{1-20}$ (such as methylsulfonyl, butylsulfonyl), arylsulfonyl groups having $C_{7-12}$ (such as phenylsulfonyl, 2-naphtylsulfonyl), sulfamoyl groups having $C_{0-20}$ (such as non-substituted sulfamoyl, methylsulfamoyl), heterocyclic groups (such as 4-pylidyl, piperidino, 2-furyl, furfuryl, 2-thienyl, 2-pyrrolyl, 2-quinolylmorpholine).

More preferably, X represents a group having any of the following structures.

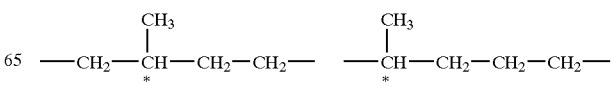

-continued

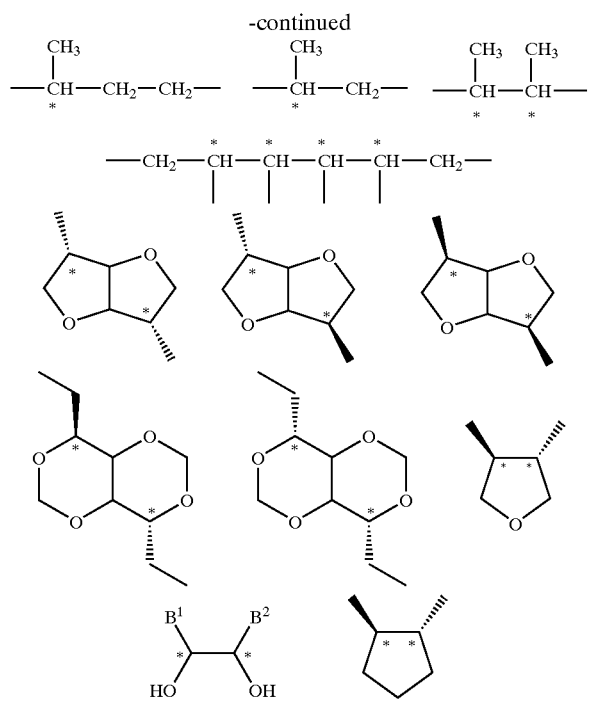

In the formula, $B^1$ and $B^2$ independently represent a C1-4 alkyl group which may be substituted or contain —O— (i.e. which may be substituted by an alkoxy group), an optionally substituted phenyl group or an optionally substituted carboxyl group.

More preferably, X represents a cyclic group having an optically active site shown below.

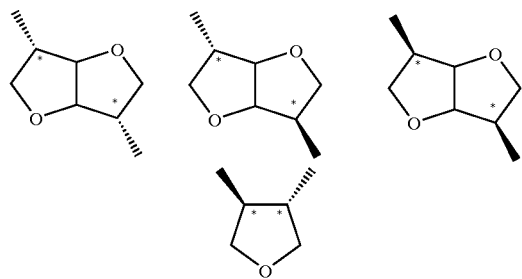

In the formula (I) above, M represents a group having at least one aromatic carbocycle or aromatic heterocycle.

The aromatic carbocycle is preferably a benzene, naphthalene, anthracene or phenanthrene ring, more preferably a benzene or naphthalene ring, most preferably a benzene ring. When M represents a group having a benzene ring or a naphthalene ring, $Y^1$ and $Y^2$ are preferably attached to M at the position where $Y^1$ and $Y^2$ are in a line, e.g., $Y^1$ and $Y^2$ are preferably attached to a benzene ring at the 1,4-position or a naphthalene ring at the 2,6-position.

The aromatic heterocycle is preferably a 6-membered ring containing 1 to 3 nitrogen atoms (e.g., a pyridine, pyridazine, pyrimidine, pyrazine or triazine ring) or a 5-membered ring containing an N atom, O atom or S atom (e.g., a pyrrole, imidazole, furan, oxazole, 1,3,4-oxadiazole, thiophene, thiazole or 1,3,4-thiadiazole ring), more preferably a pyridine, pyridazine, pyrimidine, pyrazine, 1,3,4-oxadiazole, thiophene or 1,3,4-thiadiazole ring, still more preferably a pyridine, pyridazine, pyrimidine or pyrazine ring. When M represents a group having an aromatic heterocycle, $Y^1$ and $Y^2$ are also preferably attached to M at the position where $Y^1$ and $Y^2$ are in a line, e.g., $Y^1$ and $Y^2$ are preferably attached to a pyridine, pyrimidine, pyrazine, 1,3,4-oxadiazole, thiophene or 1,3,4-thiadiazole ring at the 2,5-position.

These aromatic carbocycles or aromatic heterocycles may have a substituent including those mentioned as substituents for X.

M preferably represents a group of formula (II) below.

Formula (II)

In the formula (II), $T^1$ and $T^2$ independently represent an aromatic carbocycle, aromatic heterocycle or aliphatic carbocycle, and at least one represents an aromatic carbocycle or an aromatic heterocycle.

The aromatic carbocycle and aromatic heterocycle represented by $T^1$ and $T^2$ are as defined for the aromatic carbocycle and aromatic heterocycle contained in M and extend a similar preferred range.

The aliphatic carbocycle is preferably a cyclohexane or decahydronaphthalene ring. $Y^3$ independently represents —O—, —C(=O)O—, —OC(=O)—, —CH$_2$O—, —OCH$_2$—, —CH=N— or —N=CH—, and $m^3$ represents 0 or 1. When $m^3$ is 0, $T^1$ and $T^2$ are directly bonded.

In the formula (II) above, r represents an integer of any of 0 to 3, preferably 0 to 2, more preferably 0 or 1.

In the formula (I) above, $Y^1$ and $Y^2$ independently represent —O—, —S—, —C(=O)O—, —OC(=O)—, —OC(=O)O—, —C(=O)N(R$^1$)—, —N(R$^1$)C(=O)—, —(CR$^2$R$^3$)$_m$O—, —SO$_2$N(R$^1$)—, —N(R$^1$)SO$_2$— or —S(=O)$_p$—. $m^1$ and $m^2$ independently represent 0 or 1, provided that when $m^1$ and $m^2$ are each 0, M and X and M and R are directly bonded.

$R^1$, $R^2$ and $R^3$ independently represent a hydrogen atom or an optionally substituted alkyl group. $R^1$ preferably represents a hydrogen atom or a C1–6 alkyl group, more preferably a hydrogen atom or a C1–4 alkyl group. $R^2$ and $R^3$ preferably represent a hydrogen atom or a C1–4 alkyl group, more preferably a hydrogen atom.

m represents an integer of any of 1 to 12, preferably any of 1 to 6, more preferably any of 1 to 4, most preferably 1 or 2.

p represents an integer of any of 0 to 2, preferably 0 or 2.

In the formula (I) above, R represents an optionally substituted alkyl group. The alkyl chain may be branched or may contain an oxygen atom (—O—), sulfur atom (—S—) or the like (i.e. may be substituted by an alkoxy or alkylsulfanyl group). These substituents include those mentioned as substituents for X. The number of carbon atoms contained in R is preferably 1 to 30, more preferably 6 to 20, still more preferably 6 to 15. R may also have a polymerizable group such as an acryloyloxy group or a methacryloyloxy group.

Specific examples of compounds of formula (I) above are shown below, but optically active compounds used in the present invention are not limited to the specific examples below.

| | R | Y² | M | Y¹ | n | X |
|---|---|---|---|---|---|---|
| 1 | (n)C₁₂H₂₅ | —O— | *p*-phenylene | —COO— | 2 | isosorbide-type bicyclic diether |
| 2 | CH₂=CHCOO—(CH₂)₁₀— | —COO— | 4,4'-biphenylene | —COO— | 2 | isosorbide-type bicyclic diether |
| 3 | (n)C₁₂H₂₅ | —O— | *p*-phenylene | —COO— | 2 | isosorbide-type bicyclic diether |
| 4 | (n)C₁₂H₂₆ | —OCO— | 4-(phenoxycarbonyl)phenylene | —COO— | 2 | isosorbide-type bicyclic diether |
| 5 | (n)C₈H₁₇ | —O— | 4,4'-biphenylene | —CH₂O— | 2 | isosorbide-type bicyclic diether |
| 6 | CH₂=CHCOO—(CH₂)₉— | —O— | 2-fluoro-1,4-phenylene | —COO— | 2 | isosorbide-type bicyclic diether |
| 7 | (n)C₁₂H₂₅ | —O— | 5-(4-pyrimidinyl)phenylene (pyrimidine–phenyl) | —COO— | 2 | isosorbide-type bicyclic diether |
| 8 | (n)C₁₄H₂₉ | —S— | *p*-phenylene | —CH₂O— | 2 | isosorbide-type bicyclic diether |
| 9 | (n)C₈H₁₇OCH₂CH₂ | —O— | 4,4'-biphenylene | —COO— | 2 | 3,4-disubstituted tetrahydrofuran (chiral) |

-continued

| | R | Y² | M | Y¹ | n | X |
|---|---|---|---|---|---|---|
| 10 | acrylate-O-(CH₂)₄- | —COO— | 2,6-dimethylnaphthalene | —CH₂O— | 2 | dimethyl tetrahydrofuran |
| 11 | (n)C₁₂H₂₅ | —O— | 4,4'-biphenyl | —OCO— | 2 | —CH₂—CH(CH₃)—CH₂—CH₂— |
| 12 | (n)C₅H₁₁CO₂CH₂CH₂ | —O— | 1,4-phenylene | —OCO— | 2 | —CH₂—CH(CH₃)—CH₂—CH₂— |
| 13 | (n)C₁₂H₂₅ | —OCO— | 4,4'-biphenyl | —COO— | 2 | —CH(CH₃)—CH₂— |
| 14 | methacrylate-O-(CH₂)₁₀- | —O— | 1,4-phenylene | —CH₂CH₂O— | 2 | —CH(CH₃)—CH₂— |
| 15 | (n)C₈H₁₇OCOCH₂ | —OCO— | phenyl-O-CO-phenyl | —COO— | 2 | —CH(CH₃)—CH(CH₃)— |
| 16 | (n)C₁₂H₂₅ | —O— | 4,4'-biphenyl | —COO— | 2 | —CH(CH₃)—CH(CH₃)— |

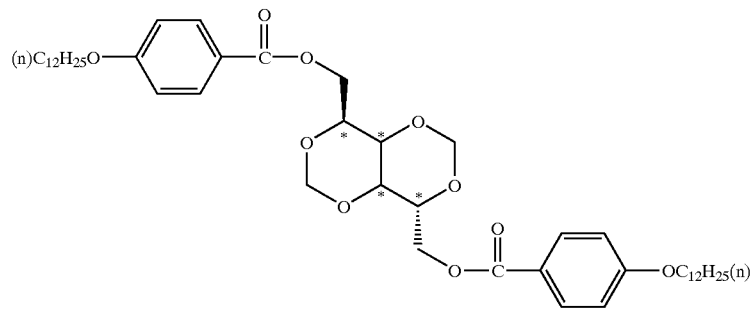

(17)

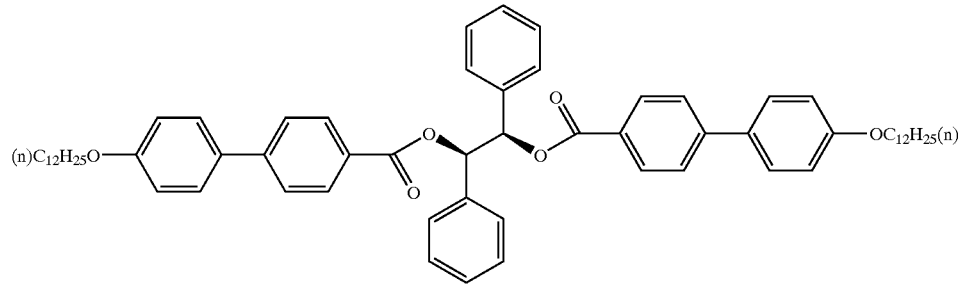

(18)

(19)
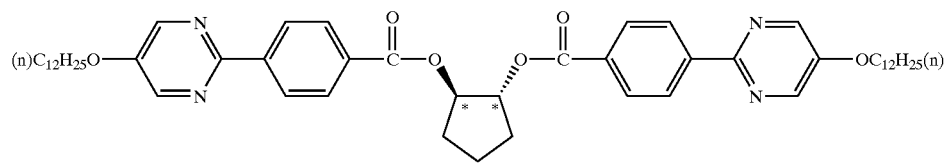

(20)
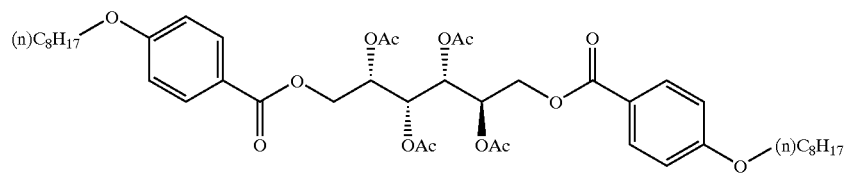

Compounds of formula (I) above can be synthesized by the process described in e.g. German Patent (DE-A) No. 3917196, JP-A 1997-506088 and JP-A 2000-515496.

In the present invention, optically active compounds of formula (I) above may be used alone or in combination with optically inactive compounds or other optically active compounds, as described above. Two or more compounds of formula (I) above may be used in combination. Materials used in combination with optically active compounds of formula (I) above are preferably liquid crystalline compounds showing a (chiral) smectic phase and chiral agents. These materials include those described in "Ferroelectric liquid crystal displays and materials" (published by CMC, edited by Fukuda, 1992) and "Handbook of liquid crystals" (Maruzen, edited by Editorial committee for Handbook of liquid crystals, 2000, pp. 267–330). The relationship between the pitch length of the helical structure or the birefringence of liquid crystal molecules and the center wavelength and the half bandwidth of selective reflection spectra is described in "Photonics series 9, Structure and physical properties of ferroelectric liquid crystals" (Fukuda and Takezoe, Corona Publishing, 1990), p. 285, according to which the half bandwidth of reflection spectra increases with the birefringence of the liquid crystal composition. For the object of the present invention, it is desirable to selectively reflect a wavelength band as broad as possible, and therefore, liquid crystal compounds used in the present invention preferably have a birefringence of 1.5 or more, more preferably 1.8 or more, still more preferably 2.0 or more.

Examples of liquid crystalline compounds and chiral agents that can be used in the present invention are shown below, but materials used in the present invention are not limited to the specific examples below.

(101)
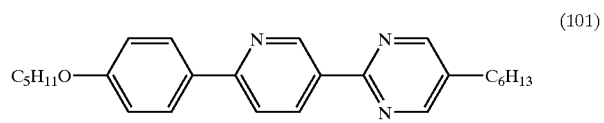

(102)
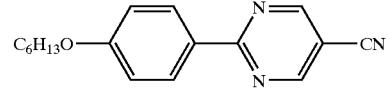

(103)
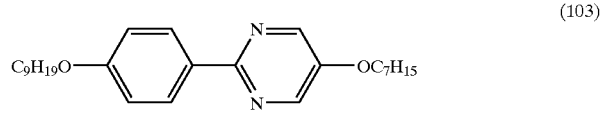

(104)
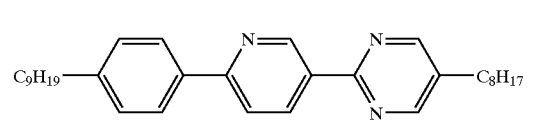

(105)
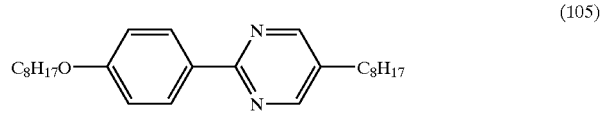

(106)
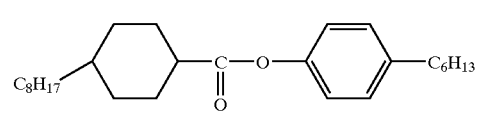

(107)
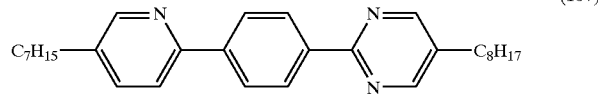

(108)
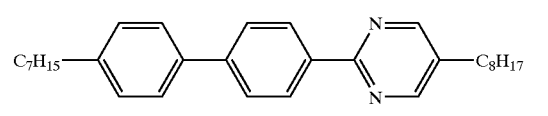

(109)
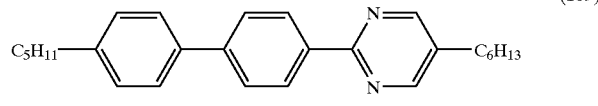

(110)
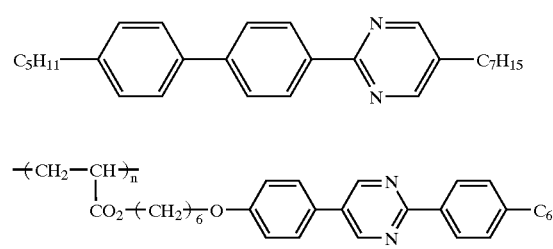

(111)
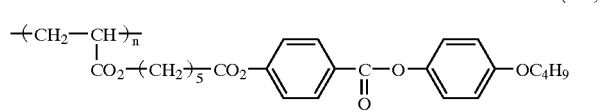

(112)

-continued

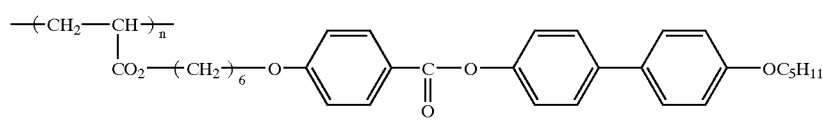

(113)

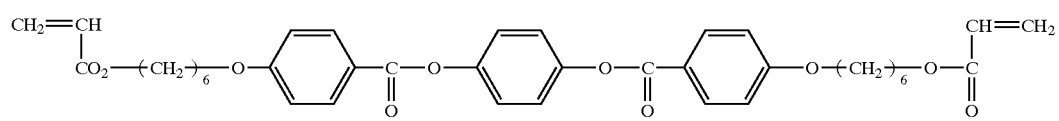

(114)

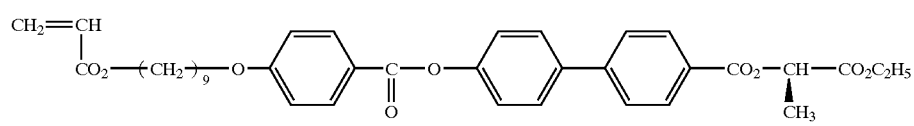

(115)

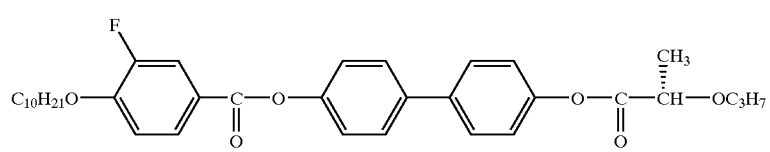

(116)

Optically active compounds of formula (I) above can induce a helical structure having a short pitch length to show desired polarization selectivity with small amounts because of the high helical twisting power of the chiral agents. When optically active compounds of formula (I) above are combined with optically inactive liquid crystalline compounds, a helical structure showing polarization selectivity can be induced by adding about 1 to 20% by mass of the optically active compounds to the optically inactive liquid crystalline compounds.

However, it is not excluded that optically active compounds of formula (I) above are added beyond the range shown above, and optically active compounds of formula (I) above are preferably contained at about 1 to 30% by mass when they are combined with liquid crystalline compounds in the present invention.

The polarization selective membrane of the present invention can be prepared by various processes, e.g. by developing the liquid crystal composition on a substrate such as glass or a plastic film and drying and then stripping it. The polarization selective film of the present invention can be prepared by developing the liquid crystal composition on a transparent support such as a plastic substrate and drying it.

Examples of the plastic substrate include, but are not specifically limited to, plastic film substrates made of polyimide, polyamide-imide, polyamide, polyether imide, polyether ether ketone, polyether ketone, polyketone sulfide, polyether sulfone, polysulfone, polyphenylene sulfide, polyphenylene oxide, polyethylene terephthalate, polybutylene terephthalate, polyethylene naphthalate, polyacetal, polycarbonate, polyallylate, acrylic resins, methacrylic resins, polyvinyl alcohol, polyethylene, polypropylene, poly-4-methylpentene-1 resins, cellulose plastics such as triacetyl cellulose, epoxy resins, phenol resins, polymer liquid crystals; these substrates having another coating such as a polyimide, polyamide, polyvinyl alcohol or silicone film; and these plastic substrates surface-treated with a silane coupling agent, metal complex such as chromium, lecithin or CTAB(cetyltrimethylammonium bromide). When the manufacturing process involves sandwiching the liquid crystal composition between a plurality of plastic substrates, homogeneous or heterogeneous plastic substrates may be combined. Among these plastic substrates, film-like substrates are preferably used.

These plastic substrates may or may not have been subjected to an orientation treatment such as rubbing.

The liquid crystal composition may be developed on the plastic substrate by directly applying the liquid crystal composition without using a solvent or applying a solution of the liquid crystal composition dissolved in a suitable solvent and then evaporating the solvent.

The solvent can be appropriately selected depending on the nature, composition and other factors of the material such as the liquid crystalline compounds and optically active compounds described above.

The examples of the solvents generally include halogenated hydrocarbons such as chloroform, dichloromethane, carbon tetrachloride, dichloroethane, tetrachloroethane, trichloroethylene, tetrachloroethylene, chlorobenzene and o-dichlorobenzene; phenols such as phenol and p-chloro phenol; aromatic hydrocarbons such as benzene, toluene, xylene, methoxybenzene and 1,2-dimetoxybenzene; alcohols such as isopropanol and tert-butanol; glycols such as glycerin, ethyleneglycol and trimethylene glycol; glycol ethers such as ethylene glycol monomethyl ether, diethylene glycol dimethyl ether, ethyl cellosolve and butyl cellosolve; acetone, methyl ethyl ketone, methyl isobutyl ketone, cyclohexane, ethyl acetate, 2-pyrrolidone, N-methyl-2-pyrrolidone, pyridine, triethylamine, tetrahydrofuran, dimethylformamide, dimethylacetamide, dimethyl sulfoxide, acetonitrile, butylonitrile, carbon disulfide and mixtures thereof.

If desired, a surfactant may be added to the solvent to control the surface tension of the solution or improve coatability or for other purposes.

The concentration of the material in the solution can be appropriately controlled depending on the nature and solubility of the material, the thickness of the film to be prepared and other factors. The concentration of the entire solute (i.e. the composition containing a liquid crystalline compound and optionally additives such as a chiral agent, hereinafter sometimes collectively referred to as "liquid crystal composition") in the solution is preferably 0.5 to 70% by mass, more preferably 1 to 50% by mass. Normally, the concentration of the liquid crystalline compound in the solution is preferably 3 to 50% by mass, more preferably 5 to 30% by mass.

The coating means include, but are not specifically limited to, spin coating, roll coating, printing, dip coating, curtain coating, Meyer bar coating, doctor blade coating, knife coating, die coating, gravure coating, microgravure coating, offset gravure coating, lip coating, spray coating and extrusion coating (U.S. Pat. No. 2,681,294). Two or more layers may be simultaneously applied. Simultaneous coating is described in U.S. Pat. Nos. 2,761,791, 2,941,898, 3,508,947 and 3,526,528 and Harasaki: "Coating technology", p. 253, Asakura Publishing (1973). After coating, the solvent is removed if desired, and the liquid crystal material can be obtained as an even layer.

Processes for preparing the polarization selective membrane and polarization selective film of the present invention comprise the step of orienting the liquid crystal composition developed on a transparent support to form the helical structure described above.

The method for orienting the liquid crystal composition is not specifically limited, e.g. a smectic liquid crystal phase having a helical structure may be obtained as the liquid crystal composition is developed if it is developed at a temperature that allows the liquid crystal composition to show the smectic liquid crystal phase having a helical structure. The liquid crystal composition may also be oriented by once heating the liquid crystal composition developed to allow it to show a phase appearing at a temperature higher than the temperature at which a smectic liquid crystal phase having a helical structure appears, e.g. to show a smectic A, chiral nematic or isotropic phase and then cooling it to a temperature at which a smectic liquid crystal phase having a helical structure appears. Heating can be carried out by passing the liquid crystal composition sandwiched by two plastic substrates between two heated rolls or through a heat-treating furnace simultaneously with or separately from lamination of the plastic substrates.

A rubbing treatment may be applied on the entire surface or a part of the substrate.

During the developing step or any of the subsequent steps such as the orientation step, the liquid crystal material developed between the interfaces may be optionally subjected to a magnetic or electric field, shear stress, flow, drawing, temperature gradient, etc. Such operations help to shorten the step of orienting the direction of the helical axis nearly perpendicular to the plane of the polarization selective membrane and polarization selective film.

When it is necessary to inhibit any variation in the performance of the polarization selective membrane and polarization selective film of the present invention with time or by heat or the like, the orientation of the molecules of the liquid crystalline compound is preferably fixed.

The orientation can be fixed by the step of e.g. (A) cooling the oriented liquid crystal molecules into a glass state, or (B) polymerizing the oriented liquid crystal molecules with the orientation being maintained.

Step (A) above can be performed by using liquid crystal molecules showing a smectic liquid crystal phase having a desired helical structure at or above the glass transition temperature and capable of turning into a glass state by cooling, such as those based on the polymer liquid crystal materials described above.

In step (A) above, the orientation of the liquid crystal molecules can be fixed in a glass state without being crystallized by heating at or above the glass transition temperature of the liquid crystal molecules and then cooling the oriented liquid crystal molecules to a temperature at which they turned into a glass state. The cooling means is not specifically limited, e.g. desired enough cooling for fixing can be accomplished only by transferring the liquid crystal molecules from the heating atmosphere used for the developing or orienting step into an atmosphere at or below the glass transition temperature such as room temperature. Forced cooling such as air-cooling or water-cooling may be performed to increase the production efficiency or the like.

Step (B) above can be performed by using liquid crystal molecules having a substituent capable of reacting by UV rays, visible light, electron rays, heat or the like. These substituents include vinyl, acryl, methacryl, vinyl ether, cinnamoyl, allyl, acetylenyl, crotonyl, aziridinyl, epoxy, isocyanate, thioisocyanate, amino, hydroxyl, mercapto, carboxylate, acyl, halocarbonyl, aldehyde, sulfonate, silanol and the like groups, preferably those groups having a multiple bond and epoxy and aziridinyl groups, more preferably acryl, methacryl, vinyl, vinyl ether, epoxy and cinnamoyl groups. In order to reduce heat- or otherwise induced variation in various performances after polymerization, compounds having 2 or more ethylenically unsaturated polymerizable groups are preferably used. Examples of compounds having 2 or more ethylenically unsaturated polymerizable groups include esters of a polyhydric alcohol and (meth)acrylic acid (e.g., ethylene glycol di(meth)acrylate, 1,4-dicyclohexane diacrylate, pentaerythritol tetra(meth)acrylate, pentaerythritol tri(meth)acrylate, trimethylolpropane tri(meth)acrylate, trimethylolethane tri(meth)acrylate, dipentaerythritol tetra(meth)acrylate, dipentaerythritol penta(meth)acrylate, pentaerythritol hexa(meth)acrylate, 1,3,5-cyclohexanetriol triacrylate, polyurethane polyacrylate, polyester polyacrylate), vinylbenzene and its derivatives (e.g., 1,4-divinylbenzene, 4-vinyl benzoate-2-acryloyl ethyl ester, 1,4-divinylcyclohexanone), vinyl sulfones (e.g., divinyl sulfone), acrylamides (e.g., methylene bisacrylamide) and methacrylamides. These substituents may be contained in any one or more of the liquid crystalline materials and/or non-liquid crystalline materials and/or additives, and the substituents contained in two or more materials may be identical and/or different. Moreover, two or more identical and/or different substituents may be contained in one material.

In step (B) above, the oriented liquid crystal molecules are polymerized with the orientation being maintained. Suitable polymerization means include, but are not specifically limited to, thermal polymerization, photopolymerization, polymerization induced by radiations such as γ-rays, electron radiation-induced polymerization, polycondensation, polyaddition and other reactions. Especially, photopolymerization using visible light or UV rays or electron radiation-induced polymerization is preferably used because of the ease of controlling the reaction and the advantage in manufacturing.

The thickness of the polarization selective membrane (or the polarization selective layer in the polarization selective film) of the present invention is not specifically limited, but preferably ranges from 0.1 to 50 $\mu$m, more preferably 0.2 to 25 $\mu$m, still more preferably 0.3 to 15 $\mu$m from the practical viewpoint.

The polarization selective membrane and polarization selective film of the present invention preferably have a maximum total transmittance of 75% or more, more preferably 85% or more on the polarization plane perpendicular to the membrane surface. If this value is less than 75%, a marked brightness improving effect cannot be obtained because of the low transmittance of the membrane. The maximum total transmittance for circularly polarized light perpendicularly incident on the membrane surface on the blocking side is preferably less than 60%, more preferably less than 40%. If this value is 60% or more, a marked brightness improving effect cannot be obtained, either, because the light that should have been returned backward has been transmitted.

The polarization selective membrane of the present invention is preferably formed as a flat layer in order to homogenize separation performance or the like, and even when it is formed as a stack of two or more layers, each layer is also preferably flat. As described above, the polarization selective membrane may also be formed as a stack of two or more layers. Stacking is advantageous for providing separation function over a broader wavelength band or dealing with a wavelength shift of obliquely incident light, and in this case it is preferable to stack a combination of layers reflecting non-specific circularly polarized light at different center wavelengths. For example, a polarization selective membrane capable of covering a wide wavelength band can be efficiently formed by superposing 2–6 liquid crystal layers reflecting circularly polarized light in the same polarization direction and having center wavelengths of selective reflection differing by 50 nm or more from each other in the range of 300–900 nm. When liquid crystal layers are superposed, it is especially advantageous to use liquid crystal polymers from the viewpoint of production efficiency or formation of a thin film.

Methods for polarizing, polarizing plate and liquid crystal display devices using the polarization selective membrane and polarization selective film of the present invention are explained below with reference to schematic figures. In the figures described below, various components of the polarization selective film and retarders may be integrally laminated or separated. They are arranged in such a manner that the polarization selective film maybe interposed between the light emerging side of the sheet-like light emitter and the retarder.

FIG. 1 is a schematic diagram showing the structure of the most basic liquid crystal display device using a polarization selective film containing a polarization selective membrane of the present invention.

Liquid crystal display device 10 comprises a sheet-like emitting light source including a backlight source 11, a reflector 12 successively allowing backlights to emerge from the bottom to the top and a light guide 13. Above the light source are arranged a polarization selective film 18, a retarder 17 and a liquid crystal cell 16 sandwiched between two light-absorbing polarizing plates 14 and 15 in this order. Retarder 17 and light-absorbing polarizing plates 14 and 15 are arranged to maximize the transmittance of the linearly polarized light emerging from retarder 17.

The light from backlight source 11 is reflected by reflector 12 and guided by light guide 13 to enter polarization selective film 18 above. Specific circularly polarized light of the incident light passes through polarization selective film 18 and retarder 17 to the outside. On the other hand, the other circularly polarized light is reflected by polarization selective film 18 and the reflected light is depolarized by the light guide or the like and reflected by the reflector and returned to polarization selective film 18 and reused.

The light reflected by polarization selective film 18 is changed in the polarization state, whereby the reflected light partially or totally turns into specific circularly polarized light capable of passing through polarization selective film 18. Thus, the reflected light is confined between polarization selective film 18 and reflector 12 and repeatedly reflected until it becomes specific circularly polarized light capable of passing through polarization selective film 18. On the other hand, the circularly polarized light emerging from polarization selective film 18 enters retarder 17 where it is phase-shifted and the light phase-shifted by a quarter wavelength is converted into linearly polarized light while the light having the other wavelength is converted into elliptically polarized light. The elliptically polarized light becomes flatter as its wavelength approaches the wavelength of the light converted into linearly polarized light. As a result, the light rich in linearly polarized components capable of passing through light-absorbing polarizing plate 14 emerges from retarder 17, and the light emerging from retarder 17 enters liquid crystal cell 16 sandwiched between light-absorbing polarizing plates 14 and 15 so that it is used to display images.

Figure 4:
FIG. 4 is a schematic diagram showing the structure of a conventional liquid crystal display device.

Thus, the utilization efficiency of the light used to display images in liquid crystal display device 10 is remarkably improved as compared with liquid crystal display devices of conventional structures (e.g. the liquid crystal display device shown in FIG. 4).

In liquid crystal display device 10, the light utilization efficiency is improved by reusing the light reflected by polarization selective film 18 as emerging light having polarization converted to prevent reflection loss and controlling the phase of the emerging light via retarder 17 and converting it into a light state rich in linearly polarized components capable of passing through light-absorbing polarizing plates 14 and 15 to prevent absorption loss caused by light-absorbing polarizing plates 14 and 15.

Moreover, liquid crystal display device 10 uses a polarizing system having a structure comprising a sheet-like light emitter formed of a backlight source 11, a reflector 12 and a light guide 13; a polarization selective film 18; and retarder 17. The polarizing system 19 forms polarized light likely to pass through polarizing plates with high light utilization efficiency, as described above. It can be advantageously applied as a backlight system or the like in not only liquid crystal display devices but also various other equipments because it can also be formed in a large area.

Figure 2:
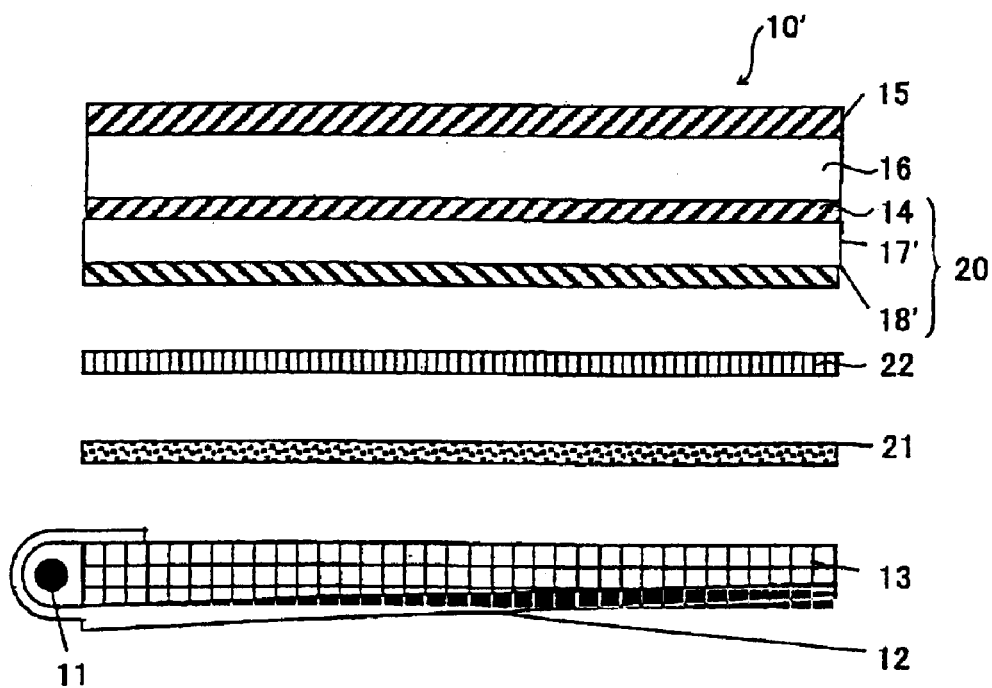
FIG. 2 is a schematic diagram showing another embodiment of a liquid crystal display device using a polarization selective film of the present invention.

FIG. 2 is a schematic diagram of a liquid crystal display device using a polarization selective film of the present invention as a protective film for polarizing plates.

Liquid crystal display device 10' shown in FIG. 2 has a structure in which polarization selective film 18' and retardation film 17' are laminated to light-absorbing polarizing plate 14. Polarization selective film 18' and retardation film 17' serve like polarization selective film 18 and retardation film 17 in FIG. 1, respectively, and also serve as protective films for light-absorbing polarizing plate 14. In contrast to the liquid crystal display device shown in FIG. 1 in which the light utilization efficiency decreases by about 10% because of the reflection on the surface opposite to the polarization selective layer of polarization selective film 18 and on the surfaces of retardation film 17 and light-absorbing polarizing plates 14 and 15, the light utilization efficiency in liquid crystal display device 10' shown in FIG. 2 increases by about 10% as compared with the liquid crystal display device shown in FIG. 1 because polarization selective film 18', retardation film 17' and light-absorbing polarizing plate 14 are laminated to eliminate the reflection surfaces described above.

Liquid crystal device 10' also comprises a scattering sheet 21 and a light-collecting film 22. Scattering sheet 21 is a translucent sheet that mainly contributes to diffusing the incident light from the sheet-like light emitter to evenly illuminate the entire surface. Light-collecting film 22 contributes to collecting the incident light to further improve the light utilization efficiency.

Figure 3:
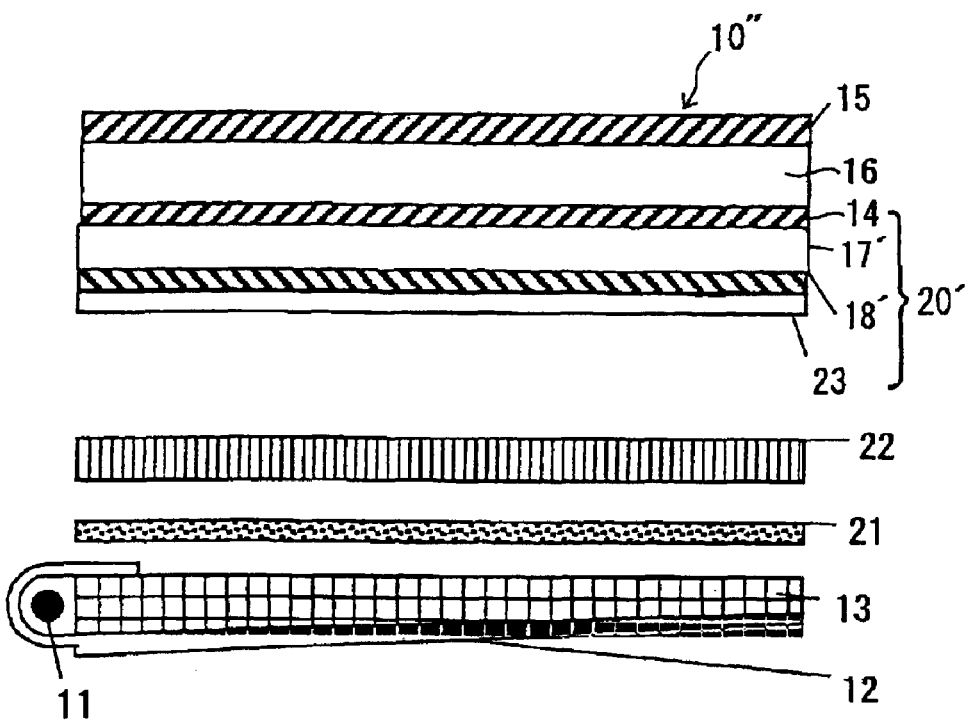
FIG. 3 is a schematic diagram showing a still another embodiment of a liquid crystal display device using a polarization selective film of the present invention.

FIG. 3 shows an example of the structure of a liquid crystal display device in which the brightness improving function of the polarization selective film or polarizing plate of the present invention has been further improved.

Liquid crystal display device 10" shown in FIG. 3 further comprises an anti-reflection layer 23 laminated to the surface of the polarization selective layer of polarization selective film 18' directly or via another layer in addition to liquid crystal display device 10' shown in FIG. 2. Reflection on the surface of the polarization selective layer can be further reduced and the amount of the light entering the polarization selective layer can be increased as compared with liquid crystal display device 10' shown in FIG. 2 by laminating anti-reflection layer 23. Anti-reflection layer 23 may be a stack of a low-refractive index layer and a high-refractive index layer as described in Journal of Japan Photographic Association, Vol. 29, P. 137 (1966), or may be a single low-refractive index layer.

Liquid crystal display devices 10' and 10" shown in FIG. 2 and FIG. 3 use stacks 20 and 20' of polarization selective film 18', retarder 17 and light-absorbing polarizing plate 14 laminated in this order as polarizing plates. The light entering light-absorbing polarizing plate 14 has been converted into linearly polarized components capable of passing through light-absorbing polarizing plate 14 by passing through polarization selective film 18' and retarder 17', whereby the loss of the light entering polarization selective film 18' and exiting light-absorbing polarizing plate 14 is remarkably reduced as compared with the case where it is passed through only light-absorbing polarizing plate 14. Thus, polarizing plates 20 and 20' can convert the incident light into specific polarized light with high utilization efficiency.

When the polarization selective film of the present invention is used in a liquid crystal display device, the light utilization efficiency is increased with the result that the brightness of the display is increased. In order to increase the brightness, the transmittance Tmax on the polarization plane for which the total transmittance is maximum is preferably 75% or more and the transmittance Tmin on the polarization plane for which it is minimum is preferably less than 60%, more preferably Tmax is 80% or more and Tmin is 50% or less, especially Tmax is 85% or more and Tmin is 40% or less.

The polarization selective film of the present invention can also be used in combination with a visual angle compensating film as described in JP-A 1990-160204 or Japanese Patent No. 2587398.

FIGS. 1 to 3 use a sheet-like light emitter as a light source consisting of a light guide having a backlight source on the side face and a reflector at the bottom, but light sources used in the present invention are not limited to this arrangement so far as they emit light in the form of a sheet and have a reflective layer also serving as a polarization converting layer. For example, a direct backlight without using a light guide can also be used.

In the present invention, the wavelength band of the light reflected as non-specific circularly polarized light by the polarization selective film is preferably substantially consistent with the wavelength band of the output light originating from the sheet-like light emitter used in combination as a light source. When the output light contains dominant wavelengths such as bright line spectra, it is more advantageous for the efficiency of selecting polarized light to match one or more such dominant wavelengths to the wavelength of the reflected light originating from the smectic liquid crystal phase or the like of the polarization selective film. When the polarization selective membrane is formed in a stack structure, not only abroad wavelength band of light can be dealt with but also the necessary number of layers to be superposed can be reduced to provide a benefit for decreasing the thickness of the polarization selective layer. The wavelength of the reflected light is preferably consistent with one or more dominant wavelengths of the sheet-like light emitter within the range of 20 nm.

In the present invention, the retarder provided above the polarization selective film has the purpose of changing the phase of the circularly polarized light emerging from the polarization selective film to convert it into a state rich in linearly polarized components more likely to pass through polarizing plates. Thus, retarders can be preferably used capable of converting the circularly polarized light emerging from the polarization selective film into a state rich in linearly polarized light to correspond to a phase change of a quarter wavelength and also converting the light of the other wavelength into flat elliptically polarized light having a major direction as possible as parallel to the linearly polarized light and as possible as close to the linearly polarized light.

By using a retarder as described above, the direction of the linearly polarized light of the output light or the direction of the major axis of the elliptically polarized light can be arranged as possible as parallel to the transmission axis of the polarizing plate to give light rich in linearly polarized components capable of passing through the polarizing plate.

Preferably, the retarder used in the present invention can be formed by an appropriate material to provide a transparent retarder giving an even phase change. The phase change in the retarder can be appropriately determined depending on the wavelength band of the circularly polarized light emerging from the polarization selective film and other factors. In the visible region, retarders giving a small phase change, specifically a phase change of 100–200 nm can often be preferably used from the viewpoint of wavelength characteristics and practicability, also considering that most retarders show positive wavelength dispersion of birefringence because of the characteristics of the material.

The retarder can be formed in one or more layers. In the case of retarders consisting of a single layer, those showing smaller wavelength dispersion of birefringence are preferred for homogenization of the polarization state of each wavelength. Stacked retarders are effective for improving wavelength characteristics in the wavelength band, and the combination can be appropriately determined depending on the wavelength band or other factors.

When left-handed circularly polarized light enters a retarder giving a phase change of 100 to 200 nm as described above, the transmission of the polarizing plate can be improved by orienting the fast axis of the retarder at an angle of 0 to 90°, preferably 35 to 55°, especially 45° with respect to the polarization axis of the polarizing plate (0°). When right-handed circularly polarized light enters the retarder, the transmission of the polarizing plate can be improved by orienting the slow axis of the retarder at the angle described above. When the retarder consists of 2 or more layers, especially when the outer surface layer is occupied by a layer giving a phase change of 100 to 200 nm, these angles in such a layer are preferably decided as described above.

When a retarder consisting of 2 or more layers is used in the visible region, one or more odd number of layers giving a phase change of 100 to 200 nm are preferably contained for obtaining light rich in linearly polarized components. Layers other than those giving a phase change of 100 to 200 nm are preferably formed by, but not limited to, layers giving a phase change of normally 200 to 400 nm in terms of the improvement in wavelength characteristics or the like.

EXAMPLES

The present invention will further be detailed referring to specific Examples. It is to be noted that any materials, reagents, ratios of use thereof and operations shown in the Examples below can properly be modified without departing from the spirit of the present invention. Thus the present invention is by no means limited to the Examples described below.

Example 1

In this example, the temperature dependences of the wavelength of selective reflection of cholesteric liquid crystals and chiral smectic liquid crystals are compared to demonstrate advantages of the present invention using a chiral smectic phase.

Liquid crystal molecules consisting of a mixture of specific compounds (108), (109) and (110) in equal mass were mixed with 30% by mass of a chiral agent (CE7 from BDH), and the mixture was heated to 130° C. and then cooled at a rate of −5° C./min with the result that a cholesteric phase appeared at 119.4° C. ($T_N$) and a chiral smectic C (Sc*) phase appeared at 60.9° C. (Tc). Thus, it was found that the mixture of these liquid crystals and chiral agent shows a cholesteric phase and a chiral smectic phase with the same composition, and this mixture was used to examine the temperature dependence of the wavelength of selective reflection (in terms of the helical pitch length) of each phase.

Experiments were performed by injecting the mixture into a horizontally oriented cell having a cell gap of 50 µm (KSRO-50/A511N7NSS(ZZ) from EHC) and measuring the helical pitch length at the temperatures 5° C. and 15° C. lower than the transition temperatures to the cholesteric phase and chiral smectic phase ($T_N$, $T_C$) during cooling to determine the rate of change. As a result, the pitch length changed by 27% in cholesteric phase but only 19% in the chiral smectic phase, showing that the temperature dependence of the pitch length is smaller in the chiral smectic phase. This result shows that the selective reflection wavelength of the chiral smectic phase is less temperature-dependent when a liquid crystal layer selectively reflecting a specific wavelength band is formed, which is favorable for controlling the temperature during the formation of the liquid crystal layer and greatly advantageous for manufacturing processes.

When a chiral smectic phase was formed at 55° C., the angle formed by the orientation of the long axis of the liquid crystals and the normal direction of the cell was 22°.

Example 2

In this example, the angle dependences of the wavelength of selective reflection of cholesteric liquid crystals and chiral smectic liquid crystals are compared to demonstrate advantages of the present invention using a chiral smectic phase.
(Determination of Transmittance)

A spectrophotometer UV-3100PC from Shimadzu was used to determine selective reflection of circularly polarized light. A test system was formed by arranging a light source, an absorptive-type linear polarizing plate (HLC-5618S from Sanritz), a λ/4 plate (PURE-ACE WR, W-159 from Teijin), a sample and a receiver in this order. A baseline was established by replacing the sample with a glass plate. For a sample selectively reflecting right-handed circularly polarized light, the transmittance on the transmission side was determined by measuring the transmittance when left-handed circularly polarized light was entered and the transmittance on the blocking side was determined by measuring the transmittance when right-handed circularly polarized light was entered. For a sample selectively reflecting left-handed circularly polarized light, the transmittance on the transmission side was determined by measuring the transmittance when right-handed circularly polarized light was entered and the transmittance on the blocking side was determined by measuring the transmittance when left-handed circularly polarized light was entered. The incident right-handed circularly polarized light and left-handed circularly polarized light were created by rotating the slow axis of a λ/4 plate next to the absorptive linear polarizing plate by 90°.
(Preparation of Circular Polarizing Elements)

A solution of 10% by mass of liquid crystals forming a chiral smectic C phase (liquid crystal FLC-6304 from Rolic) in chloroform was applied on a polyethylene terephthalate film and dried. The thickness of the FLC-6304 layer after drying was 2 µm. Then, the temperature was raised to 120° C. and then lowered to room temperature at a rate of −5° C./min to prepare a circular polarizing element formed of a chiral smectic C phase (H-1). When the liquid crystals formed a chiral smectic C phase, the angle formed by the orientation of the long axis of the liquid crystals and the normal direction of the cell was 22°.

As a comparative sample, a solution of 10% by mass of liquid crystals forming a cholesteric phase (a mixture of 85% by mass of DON-103 from Dainippon Ink and 15% by mass of a commercially available chiral agent) in chloroform was applied on a polyethylene terephthalate film and dried. The thickness of the liquid crystal layer after drying was 2 µm. Then, the temperature was raised to 120° C. and then lowered to room temperature at a rate of −5° C./min to prepare a circular polarizing element formed of a cholesteric phase (R-1).
(Preparation of Linear Polarizing Elements)

Thus prepared circular polarizing element (H-1) and a λ/4 plate (PURE-ACE WR, W-159 from Teijin) were laminated to each other to prepare a linear polarizing element (HA-1). As a comparative sample, the circular polarizing element (R-1) and a λ/4 plate (Teijin) were laminated to each other to prepare a linear polarizing element (RA-1).
(Evaluation of the Incident Angle Dependence of the Transmittance)

The linear polarizing element (HA-1) of the present invention showed the minimum transmittance at a wavelength of 450 nm when light was entered at right angles to the polarizing element surface, while it showed the minimum transmittance at a wavelength of 380 nm when light was entered from the direction of angle of 45° with respect to the polarizing element surface. However, experiments using the linear polarizing element (RA-1) prepared as a comparative sample showed the minimum transmittance at a wavelength of 450 nm when light was entered at right angles to the polarizing element surface and the minimum transmittance at a wavelength of 350 nm when light was entered from the direction of angle of 45° with respect to the polarizing element surface. This shows that the incident angle dependence of the transmittance is smaller in the system using a chiral smectic phase of the present invention than the system using a cholesteric phase. When a polarizing element is practically mounted on a liquid crystal display, the entire visible light must be covered, which means that high dependence on the incident angle invites disadvantages such as increased thickness and increased costs because a wider range must be ensured for the long wave side. It is obvious from this point that the system using a chiral smectic phase less dependent on the incident angle is excellent.

Example 3

In this example, an optical film of the present invention is mounted on a liquid crystal display (LCD) to demonstrate that it is useful as a brightness-improving film.

(Preparation of a Circular Polarizing Element)

Similarly to Example 2, a solution of 10% by mass of FLC-6304 in chloroform was applied on a polyethylene terephthalate film and dried. The thickness of the liquid crystal layer after drying was 10 μm. Then, the temperature was raised to 120° C. and then lowered to room temperature at a rate of −5° C./min to prepare a circular polarizing element. The angle formed by the orientation of the long axis of the liquid crystals of the chiral smectic phase and the normal direction of the cell was 22°.

(Preparation of Linear Polarizing Elements)

Thus prepared circular polarizing element and a λ/4 plate (PURE-ACE WR, W-159 from Teijin) were laminated to each other to prepare a linear polarizing element.

This linear polarizing element was used as a protective layer on one side, and followed by an absorptive polarizing layer of iodine/PVA and then a protective layer formed of a triacetylcellulose film to prepare a linear polarizing element integrated with an absorptive polarizing layer.

(Determination of the Transmittance)

When right-handed circularly polarized light having a wavelength of 450 nm was entered into this linear polarizing element integrated with an absorptive polarizing layer, a transmittance of 92% was obtained. When left-handed circularly polarized light having a wavelength of 450 nm was entered, a transmittance of 35% was obtained.

(LCD Packaging)

Thus prepared linear polarizing element integrated with an absorptive polarizing layer was used as a polarizing plate on the light source side of an LC cell and mounted on a liquid crystal display device made by SHARP. The intensity of the wavelength of 450 nm in the front direction when using this linear polarizing plate integrated with an absorptive polarizing layer was measured with a spectroradiometer SR-2 made by TOPCON to give a brightness 1.10 times stronger than obtained with normal absorptive polarizing plates, confirming that the optical film of the present invention serves as a brightness-improving membrane for LCD.

Example 4

This example demonstrates that liquid crystal compositions containing a compound of formula (I) above show a chiral smectic phase and that said phase shows selective reflection. A mixture containing specific compounds (108), (109) and (110) in equal mass was mixed with specific compounds 1 and 3 and comparative compounds 1 (having a structure shown below) and 2 (CE7 from BDH) each at a content of 5% by mass to prepare liquid crystal compositions A, B, C and D.

Comparative Compound 1

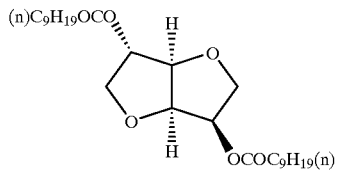

Comparative Compound 2

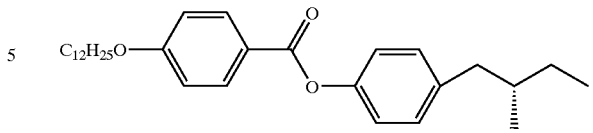

When these liquid crystal compositions were heated to a temperature at which they became isotropic liquids and then cooled at a rate of −5° C./min, selective reflection was observed in a chiral smectic C phase in liquid crystal compositions A and B. Phase-separated texture was observed in liquid crystal composition C, while no selective reflection was shown by liquid crystal composition D.

Then, liquid crystal composition E was prepared in the same manner as for liquid crystal composition D except that compound 2 was contained at 30% by mass. When this liquid crystal composition E was heated to a temperature at which it became an isotropic liquid and then cooled at a rate of −5° C./min, selective reflection was observed.

Thus, specific compounds (1) and (3) were shown to be well compatible with the smectic phase and induce a helical structure having a short pitch enough to selectively reflect visible rays at such a low content as 5% by mass.

Liquid crystal compositions A and B were injected into a horizontally oriented cell having an ITO electrode with a cell gap of 7 μm and heated to a temperature at which the compositions showed a chiral smectic C phase. When dc voltage was applied in the normal direction of the cell plane and the electric field was inverted, the angle at which the extinction position was rotated was measured to show that the angle formed by the orientation of the long axis of the liquid crystals and the helical direction was 22 to 30° in both compositions.

Example 5

In this example, an optical film using a liquid crystal composition of the present invention was mounted on a liquid crystal display (LCD) to demonstrate that it is useful as a brightness-improving film.

(Preparation of Circular Polarizing Elements)

A solution of 10% by mass of liquid crystal composition A above in chloroform was applied on a polyethylene terephthalate film and dried. The thickness of the liquid crystal layer after drying was 10 μm. Then, the temperature was raised to 120° C. and then lowered to room temperature at a rate of −5° C./min to prepare circular polarizing element A.

Circular polarizing element B was prepared exactly in the same manner except that liquid crystal composition A was replaced by liquid crystal composition B.

(Preparation of Linear Polarizing Elements)

Thus prepared circular polarizing elements A and B were each laminated to a λ/4 plate (PURE-ACE WR, W-159 from Teijin) to prepare linear polarizing elements A and B.

These linear polarizing elements A and B were each used as a protective layer on one side, and followed by an absorptive polarizing layer of iodine/PVA and then a protective layer formed of a triacetylcellulose film to prepare linear polarizing elements A and B integrated with an absorptive polarizing layer.

(Determination of the Transmittance)

When right-handed circularly polarized light having a wavelength of 450 nm was entered into these linear polarizing elements A and B integrated with an absorptive polarizing layer, transmittances of 91% and 90% were obtained respectively. When left-handed circularly polarized light having a wavelength of 450 nm was entered, transmittances of 34% and 33% were obtained respectively.

(LCD Packaging)

Thus prepared linear polarizing elements A and B integrated with an absorptive polarizing layer were each mounted on a liquid crystal display device made by SHARP as a polarizing plate on the light source side of an LC cell. The intensity of the wavelength of 450 nm in the front direction when using these linear polarizing plates integrated with an absorptive polarizing layer was measured with a spectroradiometer SR-2 made by TOPCON to give a brightness 1.09 times stronger in linear polarizing element A and 1.10 times stronger in linear polarizing element B than obtained with normal absorptive polarizing plates, confirming that the optical films of the present invention serve as brightness-improving membranes for LCD.

Having described our invention as related to the present embodiments, it is our intention that the invention not be limited by any of the details of the description, unless otherwise specified, but rather be construed broadly within its spirit and scope as set out in the accompanying claims.

What is claimed is:

1. A polarization selective membrane comprising a layer formed from a composition comprising at least one liquid crystal molecule having a helical structure and selectively transmitting specific polarized light and selectively reflecting the other polarized light, wherein the helical axis of the helical structure is practically oriented in the normal direction of the membrane plane and the angle formed by the orientation of the helical axis of the helical structure and the orientation of the long axis of the liquid crystal molecule is from 5° to 85°.

2. The polarization selective membrane of claim 1, wherein maximum total transmittance is 75% or more on the polarization plane perpendicular to the membrane surface.

3. The polarization selective membrane of claim 1, having a maximum total transmittance of 75% or more and a minimum total transmittance of less than 60% at a polarization plane perpendicular to the membrane plane.

4. The polarization selective membrane of claim 1, wherein the liquid crystal molecule exhibits a chiral smectic phase.

5. The polarization selective membrane of claim 1, wherein the composition comprising at least one liquid crystal molecule further comprises an optically active compound of formula (I) below:

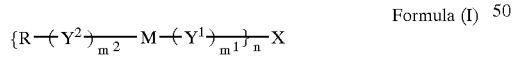

Formula (I)

wherein X represents a group having an optically active site, M represents a group having at least one aromatic carbocycle or aromatic heterocycle, $Y^1$ and $Y^2$ independently represent —O—, —S—, —C(=O)O—, —OC(=O)—, —OC(=O)O—, —C(=O)N($R^1$)—, —N($R^1$)C(=O)—, —(C$R^2R^3$)$_m$O—, —SO$_2$N($R^1$)—, —N($R^1$)SO$_2$— or —S(=O)$_p$—; $R^1$, $R^2$ and $R^3$ independently represent a hydrogen atom or an optionally substituted alkyl group; m represents an integer of any of 1 to 12, p represents an integer of any of 0 to 2, $m^1$ and $m^2$ independently represents 0 or 1, provided that when $m^1$ and $m^2$ are each 0, M and X and M and R are directly bonded; R represents an optionally substituted alkyl group and n represents an integer of any of 2 to 6.

6. The polarization selective membrane of claim 5, wherein X in Formula (I) is a cyclic group having an optically active site.

7. The polarization selective membrane of claim 5, wherein X in Formula (I) is a cyclic group selected from Group I:

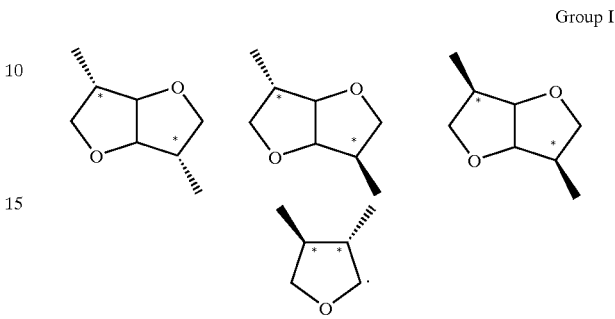

Group I

8. The polarization selective membrane of claim 5, wherein M in Formula (I) is a group represented by Formula (II) below:

Formula (II):

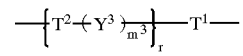

wherein $T^1$ and $T^2$ independently represent an aromatic carbocycle, aromatic heterocycle or aliphatic carbocycle, and at least one represents an aromatic carbocycle or an aromatic heterocycle; $Y^3$ independently represents —O—, —C(=O)O—, —OC(=O)—, —CH$_2$O—, —OCH$_2$—, —CH=N— or —N=CH—; $m^3$ represents 0 or 1, provided that when $m^3$ is 0, $T^1$ and $T^2$ are directly bonded; and r represents an integer of any of 0 to 3.

9. The polarization selective membrane of claim 5, wherein the liquid crystal molecule exhibits a chiral smectic phase.

10. The polarization selective membrane of claim 5, wherein the amount of an optically active compound of formula (I) is from 1 to 30% by weight based on the total amount of composition.

11. A polarization selective film comprising:

a transparent support and a layer selectively transmitting specific polarized light and selectively reflecting the other polarized light, formed from a composition comprising at least one liquid crystal molecule having a helical structure;

wherein the helical axis of the helical structure is practically oriented in the normal direction of the layer plane and the angle formed by the orientation of the helical axis of the helical structure and the orientation of the long axis of the liquid crystal molecule is from 5° to 85°.

12. A polarizing system comprising:

a polarization selective film comprising a transparent support and a layer selectively transmitting specific polarized light and selectively reflecting the other polarized light, formed from a composition comprising at least one liquid crystal molecule having a helical structure of which helical axis is practically oriented in the normal direction of the layer plane and the angle formed by the orientation of the helical axis of the helical structure and the orientation of the long axis of the liquid crystal molecule is from 5° to 85°;
a retarder having a phase change of 100–200 nm, and
a light-absorbing polarizing plate laminated in this order, wherein the direction having a polarization plane on which the total transmittance of the polarization selective film is maximum and the direction of the transmission axis of the light-absorbing polarizing plate is substantially parallel.

13. A liquid crystal display device comprising:
a backlight,
a polarization selective film comprising a transparent support and a layer selectively transmitting specific polarized light and selectively reflecting the other polarized light, formed from a composition comprising at least one liquid crystal molecule having a helical structure of which helical axis is practically oriented in the normal direction of the layer plane and the angle formed by the orientation of the helical axis of the helical structure and the orientation of the long axis of the liquid crystal molecule is from 5° to 85°,
a retarder; and
a liquid crystal cell sandwiched between a pair of light-absorbing polarizing plates arranged in this order;
wherein the backlight comprises a light guide having a light source on the side face and a reflective layer at the bottom, and the retarder has a phase change of 100 to 200 nm.

14. A liquid crystal composition comprising at least one liquid crystal showing a smectic phase and an optically active compound of formula (I) below, wherein the composition is capable of forming a helical structure in which the angle formed by the orientation of the helical axis and the orientation of the long axis of the liquid crystal molecules is from 5° to 85°:

Formula (I)

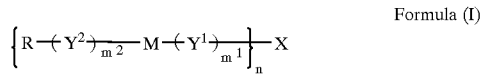

wherein X represents a group having an optically active site, M represents a group having at least one aromatic carbocycle or aromatic heterocycle, $Y^1$ and $Y^2$ independently represent —O—, —S—, —C(=O)O—, —OC(=O)—, —OC(=O)O—, —C(=O)N($R^1$)—, —N($R^1$)C(=O)—, —($CR^2R^3$)$_m$O—, —SO$_2$N($R^1$)—, —N($R^1$)SO$_2$— or —S(=O)$_p$—; $R^1$, $R^2$ and $R^3$ independently represent a hydrogen atom or an optionally substituted alkyl group; m represents an integer of any of 1 to 12, p represents an integer of any of 0 to 2, $m^1$ and $m^2$ independently represents 0 or 1, provided that when $m^1$ and $m^2$ are each 0, M is directly bonded to each of X and R; R represents an optionally substituted alkyl group and n represents an integer of any of 2 to 6.

15. The composition of claim 14, wherein X in Formula (I) is a cyclic group having an optically active site.

16. The composition of claim 14, wherein X in Formula (I) is a cyclic group selected from Group I:

Group I

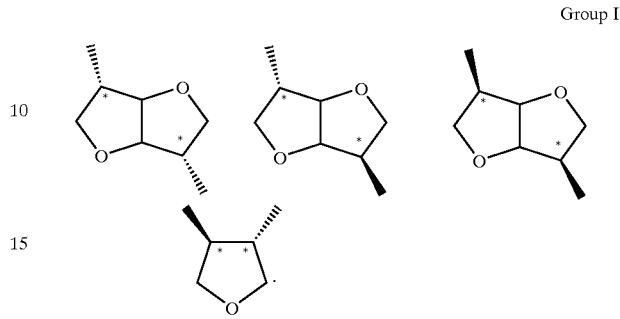

17. The composition of claim 14, wherein M in Formula (I) is a group represented by Formula (II) below:

Formula (II):

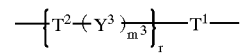

wherein $T^1$ and $T^2$ independently represent an aromatic carbocycle, aromatic heterocycle or aliphatic carbocycle, and at least one represents an aromatic carbocycle or an aromatic heterocycle; $Y^3$ independently represents —O—, —C(=O) O—, —OC(=O)—, —CH$_2$O—, —OCH$_2$—, —CH=N— or —N=CH—; $m^3$ represents 0 or 1, provided that when $m^3$ is 0, $T^1$ and $T^2$ are directly bonded; and r represents an integer of any of 0 to 3.

18. The composition of claim 17, wherein r in formula (II) is 0 or 1.

19. The composition of claim 14, wherein the composition exhibits a chiral smectic phase.

20. The composition of claim 14, wherein the amount of an optically active compound of formula (I) is from 1 to 30% by weight based on the total amount of composition.

21. The composition of claim 14, wherein the at least one liquid crystal shows a chiral smectic phase.

22. The composition of claim 14, wherein the at least one liquid crystal shows a chiral smectic C phase.

23. The composition of claim 14, wherein the at least one liquid crystal is selected from the group consisting of compounds (101) to (116) shown below, and combinations thereof:

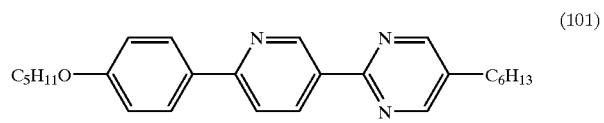

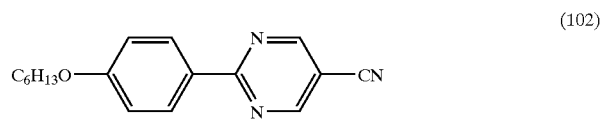

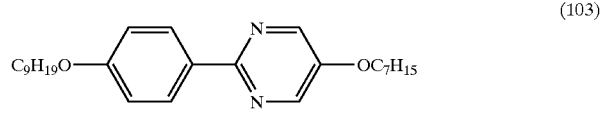

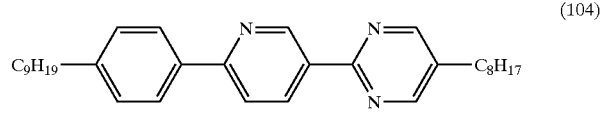

-continued
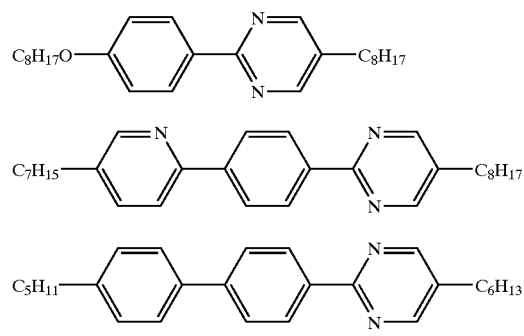
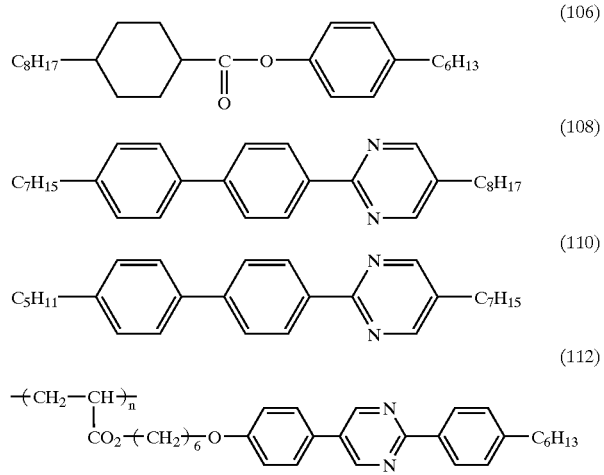
* * * * *